US012755527B2

(12) United States Patent
Ying et al.

(10) Patent No.: US 12,755,527 B2
(45) Date of Patent: Oct. 6, 2026

(54) UTILITY LINE LOCALIZATION FROM AERIAL IMAGES

(71) Applicant: Wing Aviation LLC, Palo Alto, CA (US)

(72) Inventors: Yueyang Ying, New York City, NY (US); Kyle Julian, Palo Alto, CA (US); Louis Dressel, Foster City, CA (US)

(73) Assignee: Wing Aviation LLC, Palo Alto, CA (US)

( * ) Notice: Subject to any disclaimer, the term of this patent is extended or adjusted under 35 U.S.C. 154(b) by 124 days.

(21) Appl. No.: 18/933,340

(22) Filed: Oct. 31, 2024

(65) Prior Publication Data

US 2026/0120459 A1 Apr. 30, 2026

(51) Int. Cl.

| | |
|---|---|
| ***G06V 20/17*** | (2022.01) |
| ***G05D 1/622*** | (2024.01) |
| ***G05D 109/25*** | (2024.01) |
| ***G06T 7/73*** | (2017.01) |
| ***G06V 10/74*** | (2022.01) |
| ***G06V 10/776*** | (2022.01) |

(52) U.S. Cl.

CPC ............ *G06V 20/17* (2022.01); *G05D 1/622* (2024.01); *G06T 7/74* (2017.01); *G06V 10/761* (2022.01); *G06V 10/776* (2022.01); *G05D 2109/254* (2024.01)

(58) Field of Classification Search

None

See application file for complete search history.

(56) References Cited

U.S. PATENT DOCUMENTS

| | | | | |
|---|---|---|---|---|
| 10,269,138 | B2 | 4/2019 | Li et al. | |
| 10,339,646 | B1 * | 7/2019 | Adler | G06T 7/73 |
| 10,571,932 | B2 | 2/2020 | DeBitetto et al. | |
| 2018/0218214 | A1 * | 8/2018 | Pestun | G06V 20/176 |
| 2019/0279419 | A1 * | 9/2019 | Scanlon | G02B 27/0966 |
| 2020/0074176 | A1 * | 3/2020 | Birchbauer | G01N 21/95 |
| 2024/0140628 | A1 * | 5/2024 | White | B64U 50/37 |

OTHER PUBLICATIONS

Zhang, Yong et al.: "Automatic Power Line Inspection Using UAV Images", Remote Sensing, MDPI, vol. 9, 824, Aug. 2017, 19 pages, XP055943479, DOI: 10.3390/rs9080824.

(Continued)

*Primary Examiner* — Peter D Nolan
*Assistant Examiner* — Jacob Kent Besteman-Street
(74) *Attorney, Agent, or Firm* — Christensen O'Connor Johnson Kindness PLLC

(57) ABSTRACT

A technique for localizing utility lines includes capturing aerial images of a ground area below a UAV; recording a position of the UAV when capturing the aerial images; detecting a presence of an object in the aerial images suspected to be a utility line; identifying two offset pixel points in each of the aerial images that coincide with the object in each aerial image; converting the two offset pixel points in each of the aerial images to a world frame; defining a plurality of geometric planes in the world frame each corresponding to one the aerial images, wherein the each of the geometric planes is defined by the position of the UAV when capturing a corresponding to one of the aerial images and the two offset pixel points in the world frame corresponding to the one of the aerial images; and determining an intersection approximation of the geometric planes.

19 Claims, 14 Drawing Sheets

(56) References Cited

OTHER PUBLICATIONS

Madaan, Ratnesh et al.: "Multi-view Reconstruction of Wires using a Catenary Model", 2019 International Conference on Robotics and Automation (ICRA), IEEE, May 20, 2019, pp. 5657-5664, XP033593855, DOI: 10.1109/ICRA.2019.8793852.

PCT International Search Report and Written Opinion mailed Oct. 27, 2025, in corresponding International application No. PCT/US2025/043367, 13 pages.

Zhang, Y., et al. "Automatic Power Line Inspection Using UAV Images" Remote Sensing, Aug. 2017, 20 pages.

Schofield, O.B., et al. "Autonomous power line detection and tracking system using UAVs", Microprocessors and Microsystems, Jul. 20, 2022, 14 pages.

Computer Vision, "Elements of Computer Vision", https://cs.stanford.edu/people/eroberts/courses/soco/projects/1997-98/computer-vision/motion.html, downloaded Sep. 29, 2022, 2 pages.

Zhang, H., et al., "Detecting Power Lines in UAV Images with Convolutional Features and Structured Constraints", Remote Sensing, Jun. 2019, 18 pages.

"Epipolar geometry," Wikipedia, The Free Encyclopedia, Mar. 11, 2024, https://en.wikipedia.org/wiki/Epipolar_geometry, [retrieved Sep. 13, 2024], 4 pages.

"Euler angles," Wikipedia, The Free Encyclopedia, Oct. 14, 2024, https://en.wikipedia.org/wiki/Euler_angles, 15 pages.

Carrio, A., et al., "Onboard Detection and Localization of Drones Using Depth Maps", IEEE Access, Feb. 19, 2020, 11 pages.

Dietsche, A., et al., "Powerline Tracking with Event Cameras", IEEE/RSJ International Conference on Intelligent Robots and Systems (IROS), Prague, Aug. 2021, 8 pages.

Scherr, C., et al., "Rigid Body Orientation Visualization (2nd Method: Quaternions)", https://ece.montana.edu/seniordesign/archive/SP14/UnderwaterNavigation/index.html, downloaded Sep. 16, 2024, 2 pages.

"ZXY Euler Angles", https://cookierobotics.com/081, downloaded Sep. 20, 2024, 8 pages.

* cited by examiner

X_CAMERA = (X_PIXEL-CX)/FX
Y_CAMERA = (Y_PIXEL-CY)/FY
Z_CAMERA = 1

WHERE CX, CY, FX, FY REPRESENT OPTICAL CENTER & FOCAL LENGTH OF ONBOARD CAMERA SYSTEM (KNOWN AS INTRINSIC PARAMETERS)

SWAPPING COORDINATE AXES

UTILITY LINE LOCALIZATION FROM AERIAL IMAGES

TECHNICAL FIELD

This disclosure relates generally to aerial detection of utility lines, and in particular but not exclusively, relates to utility line localization for unmanned aerial vehicles.

BACKGROUND INFORMATION

An unmanned vehicle, which may also be referred to as an autonomous vehicle, is a vehicle capable of traveling without a physically present human operator. Various types of unmanned vehicles exist for different environments. For instance, unmanned vehicles exist for operation in the air, on the ground, underwater, and in space. Unmanned vehicles also exist for hybrid operations in which multi-environment operation is possible. Unmanned vehicles may be provisioned to perform various mission types, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly populated urban/suburban environments), the UAV should be capable of effectively detecting and localizing ground-based obstacles such as utility lines.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for an unmanned aerial vehicle (UAV) to detect and localize a utility line from a series of aerial images are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to “one embodiment” or “an embodiment” means that a particular feature, structure, or characteristic described in connection with the embodiment is included in at least one embodiment of the present invention. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

A UAV delivery service that delivers packages into populated urban/suburban environments, must contend with utility lines (e.g., overhead powerlines, communication lines, etc.). These utility lines can be ubiquitous in older neighborhoods and present a particular challenge to a UAV when delivering packages to customer destinations. The thin nature and infinite extent, from the field of view (FOV) perspective of the UAV’s onboard camera system, not only makes detection challenging, but localization is even more difficult. Estimating the offset distance of a thin line, such as a powerline, that extends out of the FOV in both directions can be a difficult task. Without reliable localization, the detection of a utility line within the FOV of a UAV's camera system will often results in a mission abort. Aborted delivery missions are troublesome from a user experience (UX) perspective. Accordingly, embodiments described herein are not only capable of detecting the presence of utility lines, but are also able to localize the detected utility lines. Once a utility line is detected and localized, the UAV can navigate around the utility line within its FOV to deliver its package, rather than simply aborting the delivery mission and upsetting the UX.

Figure 1A:
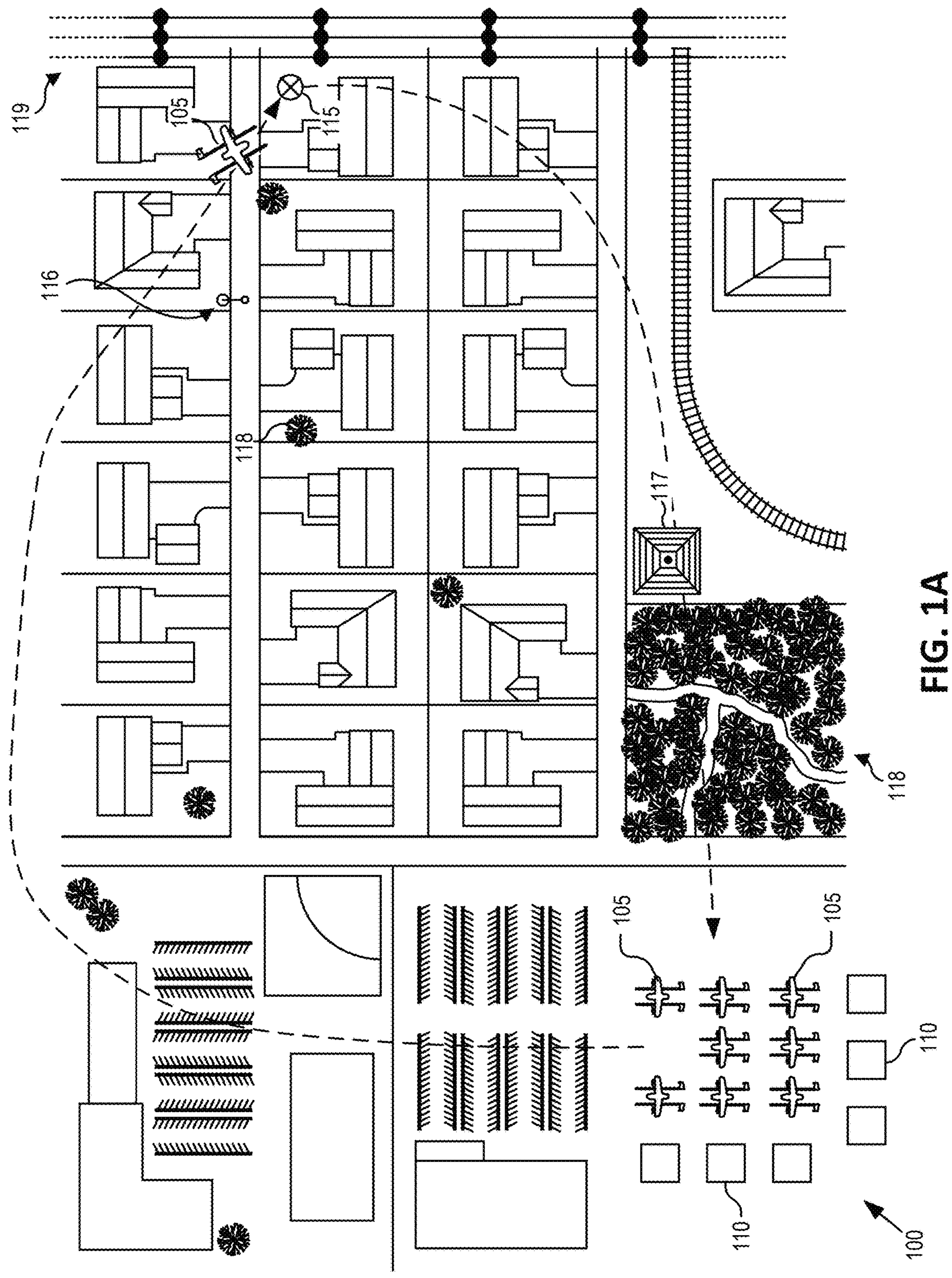
FIG. 1A illustrates operation of an unmanned aerial vehicle (UAV) delivery service that delivers packages into a neighborhood, in accordance with an embodiment of the disclosure.

FIG. 1A illustrates operation of a UAV delivery service that delivers packages into a neighborhood, in accordance with an embodiment of the disclosure. UAVs may one day routinely deliver items into urban or suburban neighborhoods from small regional or neighborhood hubs such as terminal area 100 (also referred to as a local nest or staging area). Vendor facilities that wish to take advantage of the aerial delivery service may set up adjacent to terminal area 100 (such as vendor facilities 110) or be dispersed throughout the neighborhood for waypoint package pickups (not illustrated). An example aerial delivery mission may include multiple mission phases such as takeoff from terminal area 100 with a package for delivery to a destination area 115 (also referred to as a delivery zone, drop zone, or delivery destination), rising to a cruising altitude, and cruising to the customer destination. At destination area 115, UAV 105 descends for package drop-off before once again ascending to a cruise altitude for the return cruise back to terminal area 100.

Figure 1B:
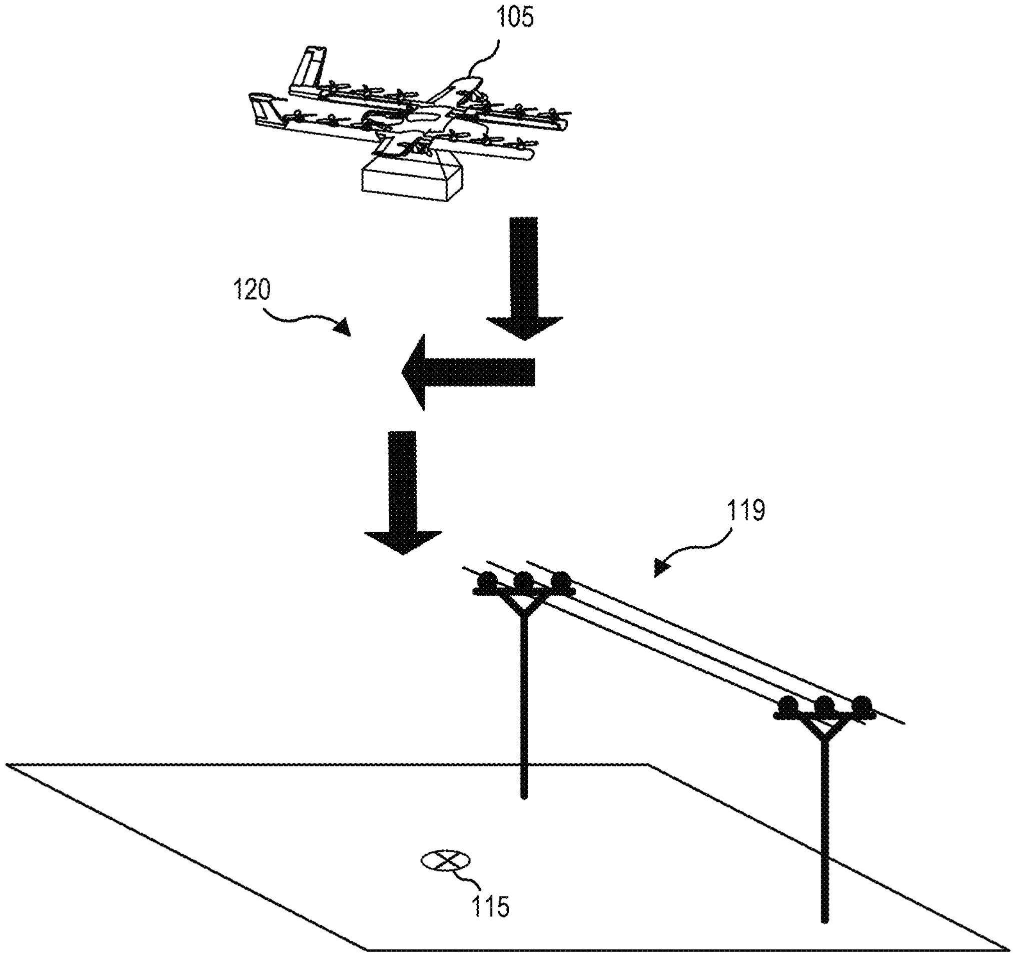
FIG. 1B illustrates how localization of a utility line enables the UAV to nudge around the obstacle as opposed to aborting a delivery mission, in accordance with an embodiment of the disclosure.

During the course of a delivery mission, ground-based obstacles are an ever-present hazard—particularly tall slender obstacles such as streetlights 116, telephone poles, radio towers 117, cranes, trees 118, and of course utility lines 119. If utility lines 119 are adjacent to the destination area 115 and are detected within the UAV's FOV, they have the potential to cause a mission abort. As illustrated in FIG. 1B, embodiments described herein enable UAV 105 to detect and localize utility lines 119 to thereby navigate around utility lines 119 by adjusting or nudging its descent pattern 120 to safely jog around the detected hazard. Without the ability to localize utility lines 119, UAV 105 is not able to reliably estimate the offset distance between itself and utility lines 119 to effectively navigate around the hazard with confidence. Without reliable localization, the delivery mission will often be aborted out of caution, but with deleterious impact on the UX.

Figure 2:
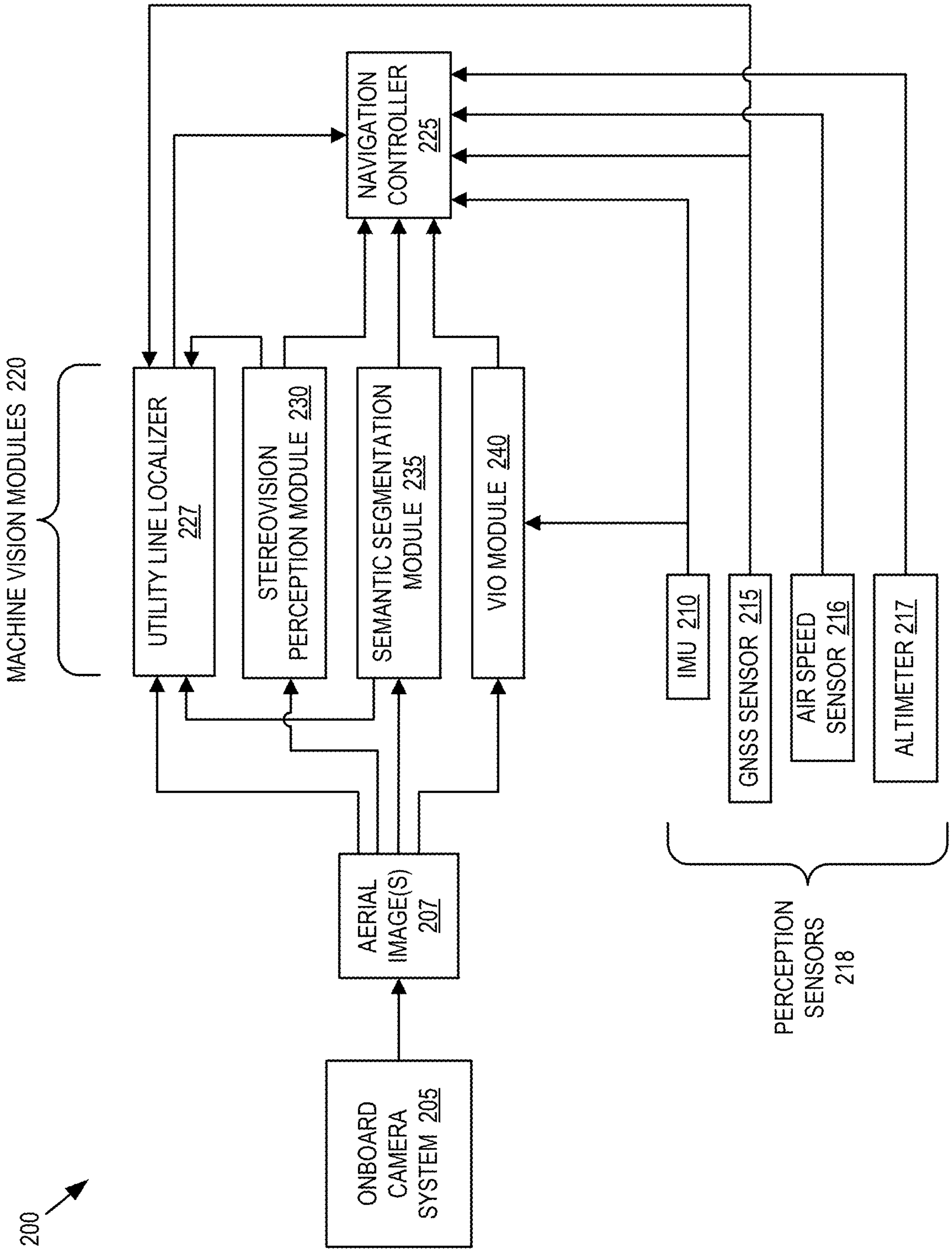
FIG. 2 is a functional block diagram illustrating a system for navigating a UAV and localizing a utility line using machine vision modules, in accordance with an embodiment of the disclosure.

FIG. 2 is a functional block diagram illustrating a system 200 for navigating a UAV 105 and localizing a utility line using machine vision modules, in accordance with an embodiment of the disclosure. System 200 includes many of the relevant software and hardware elements onboard UAVs 105 for sensing the environment (including detecting and localizing utility lines) and navigating based upon its sensed perceptions. The illustrated embodiment of system 200 includes an onboard camera system 205 for acquiring aerial images 207, an inertial measurement unit (IMU) 210, a global navigation satellite system (GNSS) sensor 215, an air speed sensor 216 (e.g., pitot tube), an altimeter 217 (e.g., air pressure sensor), machine vision modules 220, and a navigation controller 225. Collectively, the sensors 210-217 are referred to as perception sensors 218. The illustrated embodiment of machine vision modules 220 includes a utility line localizer 227, a stereovision perception module 230, a semantic segmentation module 235, and a visual inertial odometry (VIO) module 240.

Onboard camera system 205 is disposed on UAVs 105 with a downward looking orientation to acquire aerial images 207 of the ground area below it. Aerial images 207 may be acquired at a regular video frame rate (e.g., 20 f/s, 30 f/s, etc.) and a subset of the images provided to the various machine vision modules 220 for analysis. In one embodiment, onboard camera system 205 is a stereovision camera system. While capturing aerial images 207, the camera intrinsics along with sensor readings from the onboard perception sensors 218 may be recorded and indexed to aerial images 207. For example, IMU 210 may include one or more of an accelerometer, a gyroscope, or a magnetometer to capture accelerations (linear or rotational), attitude, and heading readings. GNSS sensor 215 may be a global positioning system (GPS) sensor, or otherwise, and output longitude/latitude position, mean sea level (MSL) altitude, heading, speed over ground (SOG), etc. Air speed sensor 216 captures air speed of UAV 105 while underway, which may serve as a rough approximation for SOG when adjusted for weather conditions. Altimeter 217 measures air pressure, which provides MSL altitude, which may be offset using elevation map data to estimate above ground level (AGL) altitude.

During flight missions, machine vision modules 220 are operated as part of an onboard machine vision system and may constantly receive aerial images 207 and detect and identify objects represented in those aerial images (e.g., pixelwise classification). Stereovision perception module 230 analyzes parallax between stereovision aerial images acquired by onboard camera system 205 to estimate distance to pixels/features/objects in aerial images 207. These stereovision depth estimates may be referred to as a stereovision depth map (e.g., see FIG. 4D). VIO module 240 estimates the three-dimensional (3D) pose (e.g., position/orientation) of onboard camera system 205 of UAV 105 using aerial images 207 and IMU 210. In other words, VIO module 204 provides ego-motion tracking relative to the surrounding environment of UAV 105. Semantic segmentation module 235 uses image segmentation to inform object detection and identification (e.g., pixelwise classification) along with feature tracking within aerial images 207. Feature tracking includes the identification and tracking of features within aerial images 207. Features may include edges, corners, high contrast points, etc. of objects within aerial images 207. Recognized objects may be tracked and the classifications provided to other modules responsible for making real-time flight decisions.

Utility line localizer 227 is also a machine vision module as it uses aerial images 207 along with outputs from one or more other machine vision modules 220 to localize utility lines. In the illustrated embodiment, utility line localizer 227 uses the outputs of both stereovision perception module 230 and semantic segmentation module 235 to detect and localize utility lines 119.

Collectively, machine vision modules 220 provide vision-based analysis and understanding of the surrounding environment, which may be used by navigation controller 225 to inform navigation decisions and perform UAV localization, automated obstacle avoidance, route traversal, etc. Of course, the outputs from machine vision modules 220 may be combined with, or considered in connection with, real-time data from any of perception sensors 218 by navigation controller 225 to make informed vision-based navigation decisions. One of these informed vision-based navigation decisions is navigation (e.g., path nudging) around utility lines 119 while descending to delivery destination 115 to deliver a package.

Figure 3A:
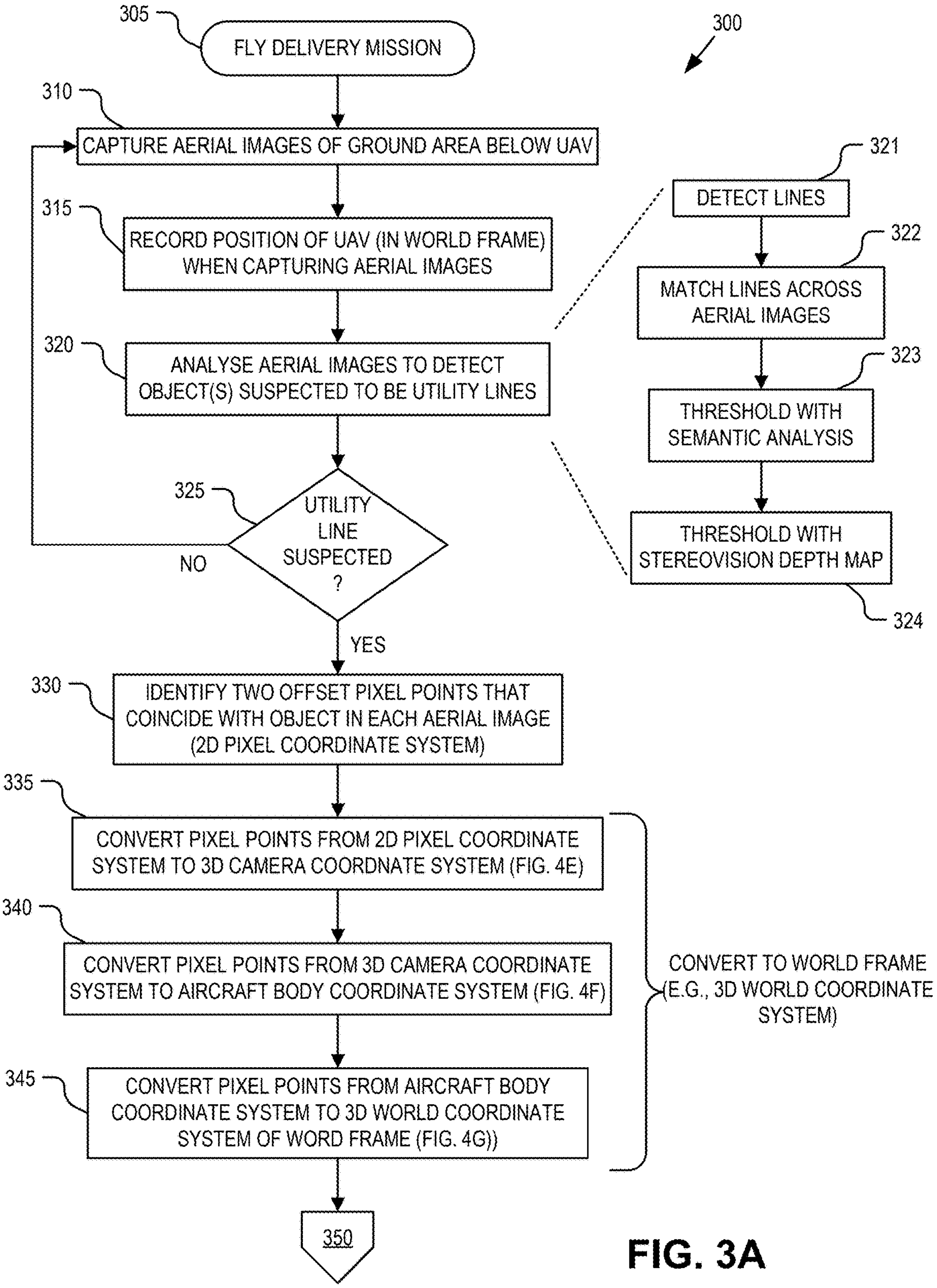
FIGS. 3A & B are a flow chart illustrating a process for detection and localization of utility lines from aerial images, in accordance with an embodiment of the disclosure.

FIGS. 3A & B are a flow chart illustrating a process 300 for localization of utility lines from aerial images 207, in accordance with an embodiment of the disclosure. Process 300 is described with reference to FIGS. 4A-J. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, UAV 105 is flying a mission (e.g., delivery mission). Upon arrival above delivery destination 115, UAV 105 captures a series of aerial image 207 of the ground area below it while descending towards the ground to drop off its package (process block 310). In connection with capturing aerial images 207, UAV 105 records its position and indexes that position to the acquired aerial images 207. In one embodiment, the position is acquired in the world frame using GNSS sensor 215 and/or other onboard localization mechanisms. In one embodiment, the world frame is Earth's frame of reference and may be initially acquired in a coordinate system used by the GNSS sensor 215 and subsequently converted into a North East Down (NED) coordinate system. In one embodiment, the NED coordinate system has a 3D origin coordinate (0,0,0) set at the landing pad from which the UAV 105 launched at terminal area 100.

Figure 4A:
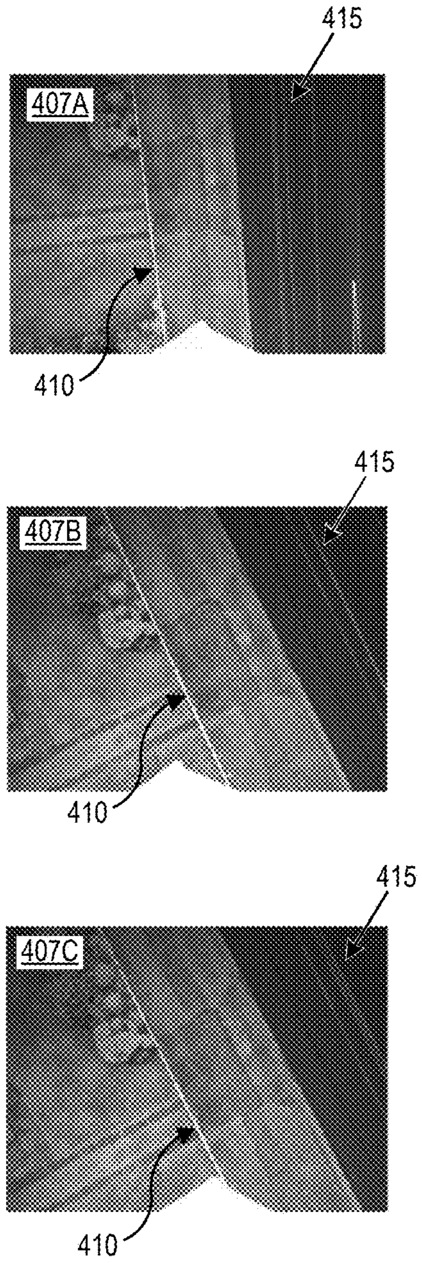
FIG. 4A illustrates a sequence of aerial images of a ground area including an object suspected to be a utility line, in accordance with an embodiment of the disclosure.

In a process block 320, aerial images 207 are analyzed to detect the presence of a utility line 119. While detection is a precursor to localization, it is a distinct problem from localization. In one embodiment, this detection is performed onboard UAV 105 by utility line localizer 227. It is anticipated that detection of a utility line in aerial images 207 may be implemented a variety of different ways. Process blocks 321-324 describe one possible detection algorithm though other techniques may be used. In the illustrated embodiment, utility line localizer 227 analyzes aerial images 207 with one or more of a Hough Line Transform, an edge detection algorithm (e.g., Canny, Sobel, etc.), a line segment detector, or otherwise to obtain a preliminary line detection (process block 321) on a given aerial image 207 and then the detected line is matched across multiple aerial images 207 (process block 322). Object tracking may be used to match a line across multiple aerial images 107. FIG. 4A illustrates a series of aerial images 407A, 407B, and 407B (collectively referred to as aerial images 407). Aerial images 407 include a number of lines, including a fence line 410 and utility lines 415, each of which may trigger an initial line detection dependent upon the particular line detection algorithm used.

Figure 4B:
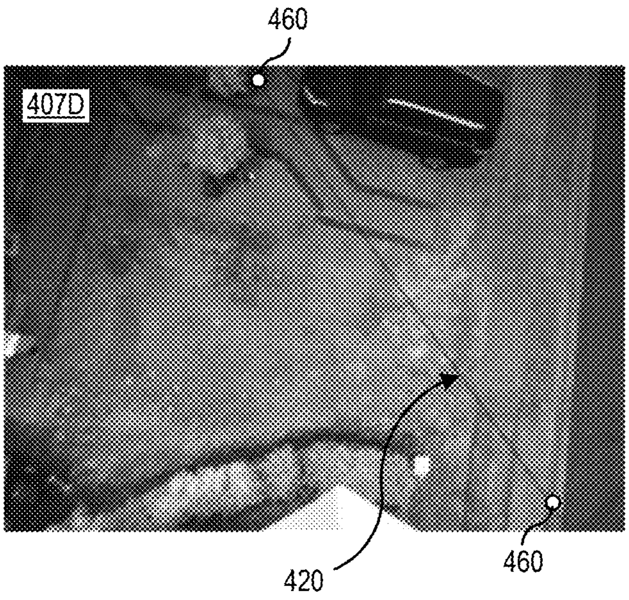
FIG. 4B illustrates an aerial image including a utility line, in accordance with an embodiment of the disclosure.
Figure 4C:
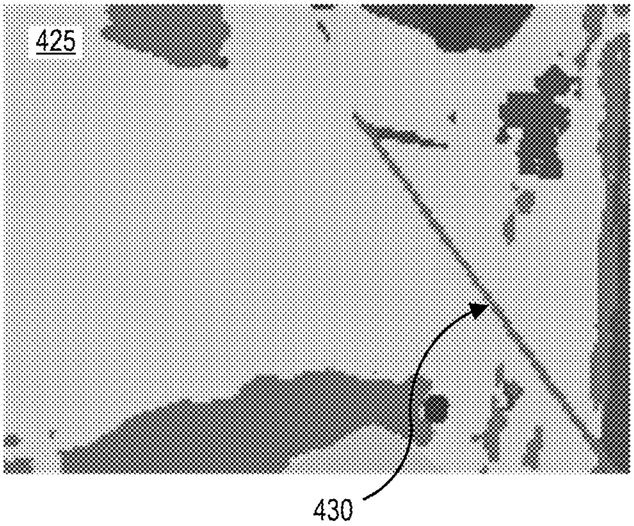
FIG. 4C illustrates a semantic segmentation of the aerial image including a utility line, in accordance with an embodiment of the disclosure.
Figure 4D:
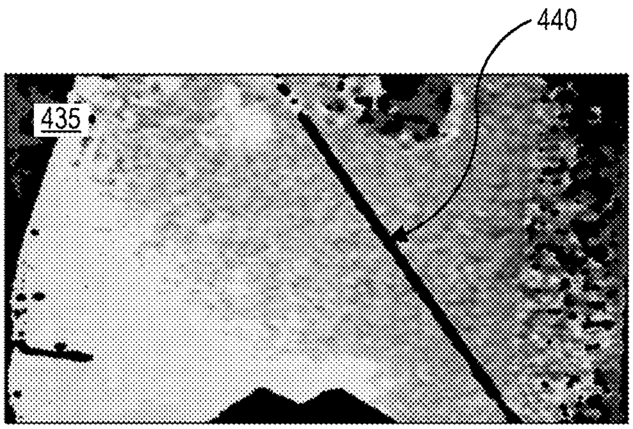
FIG. 4D illustrates a stereovision depth map of a ground area including a utility line, in accordance with an embodiment of the disclosure.

With an initial line detected and matched across multiple aerial images 407 (or 207), utility line localizer 227 thresholds those initial detections against outputs from one or more of the other machine vision modules 220 to reduce false detections and increase detection reliability. FIGS. 4B-4D illustrate this crosscheck thresholding. For example, in a process block 323, utility line localizer 227 thresholds a detection of a utility line 420 in an aerial image 407D (FIG. 4B) against a semantic segmentation 425 (FIG. 4C) of aerial image 407D. In one embodiment, semantic segmentation 425 is a pixelwise classification of each image pixel in aerial image 407D. Semantic segmentation 425 may be output by semantic segmentation module 235 using a machine learning (ML) semantic segmentation model. As illustrated in FIG. 4C, semantic segmentation 425 has classified a number of image pixels 430 as having a utility line classification. The semantic thresholding spatially matches pixels classified as a utility line to the lines detected in process block 321 as a sort of redundant detection confirmation.

In a process block 324, utility line localizer 227 also thresholds the detection of utility line 420 in an aerial image 407D against a stereovision depth map 435 (FIG. 4D) generated based upon stereo aerial images. Stereovision depth map 435 is a depth map generated based upon parallax differences between a pair of stereo aerial images acquired by onboard camera system 205. In one embodiment, stereovision depth map 435 is output by stereovision perception module 230, or even output directly from onboard camera system 205. As illustrated in FIG. 4D, stereovision depth map 435 may help identify utility lines as the pixels associated with utility lines are often output as invalid pixels 440 in stereovision depth maps. Accordingly, the errors in the stereovision depth map often associated observed to often correlate to utility lines are be leveraged to increase detection reliability.

Accordingly, utility line localizer 227 may reference one or more of the outputs from semantic segmentation module 235 and/or stereovision perception module 230 to threshold, or otherwise confirm, detections of utility lines by other line detection algorithms (decision block 325). In some embodiments, the bias or weight applied to the confirmatory thresholding may depend upon confidence intervals output from semantic segmentation module 235 and/or the other detection algorithms used. Accordingly, a detection determination may be the weighted result of multiple detection techniques including line detection algorithms, semantic analysis, and/or stereovision depth analysis. With one or more lines within aerial images 407 suspected to be a utility line detection (decision block 325), process 300 continues to a process block 330.

In a process block 330, utility line localizer 227 identifies two offset pixel points in each of aerial images 407 that coincide with the object in each of the aerial images 407 suspected to be a utility line. FIG. 4B illustrates two example offset pixel points 460 that fall on a suspected utility line 420. Offset pixel points 460 identified in aerial image 407D along with the location of onboard camera system 205 when aerial image 407D was captured uniquely define a corresponding geometric plane that intersects UAV 105 and the suspected utility line 420. However, to uniquely define each geometric plane, the coordinate location of offset pixel points 460 and the position of UAV 105 should first be converted into a common frame of reference, such as a world frame having a 3D world coordinate system. One such 3D world coordinate system is the NED coordinate system described above in connection with process block 315.

Figure 4E:
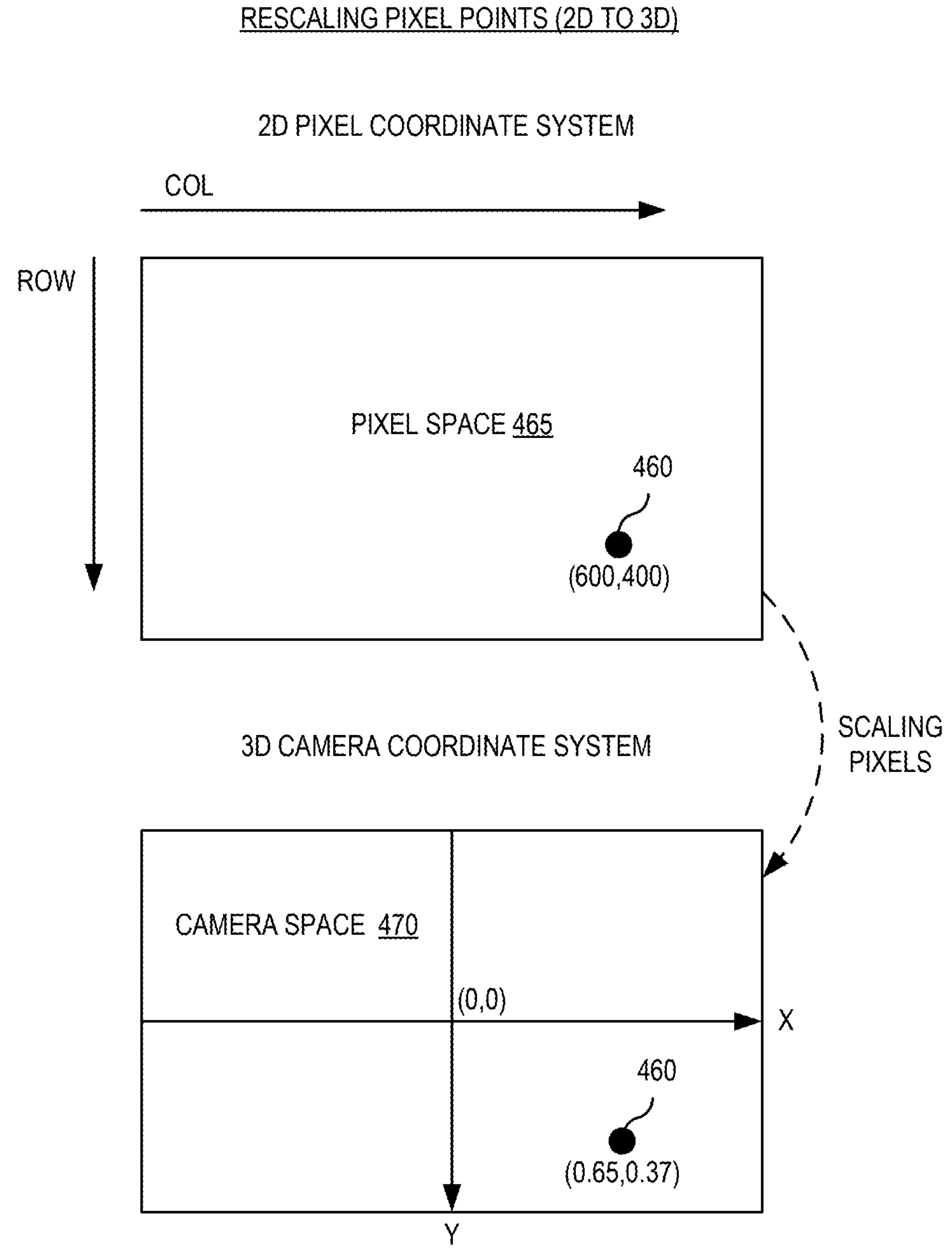
FIG. 4E illustrates rescaling pixel points between a pixel space in a two-dimensional (2D) pixel coordinate system to a camera space in a three-dimensional (3D) camera coordinate system, in accordance with an embodiment of the disclosure.
Figure 4F:
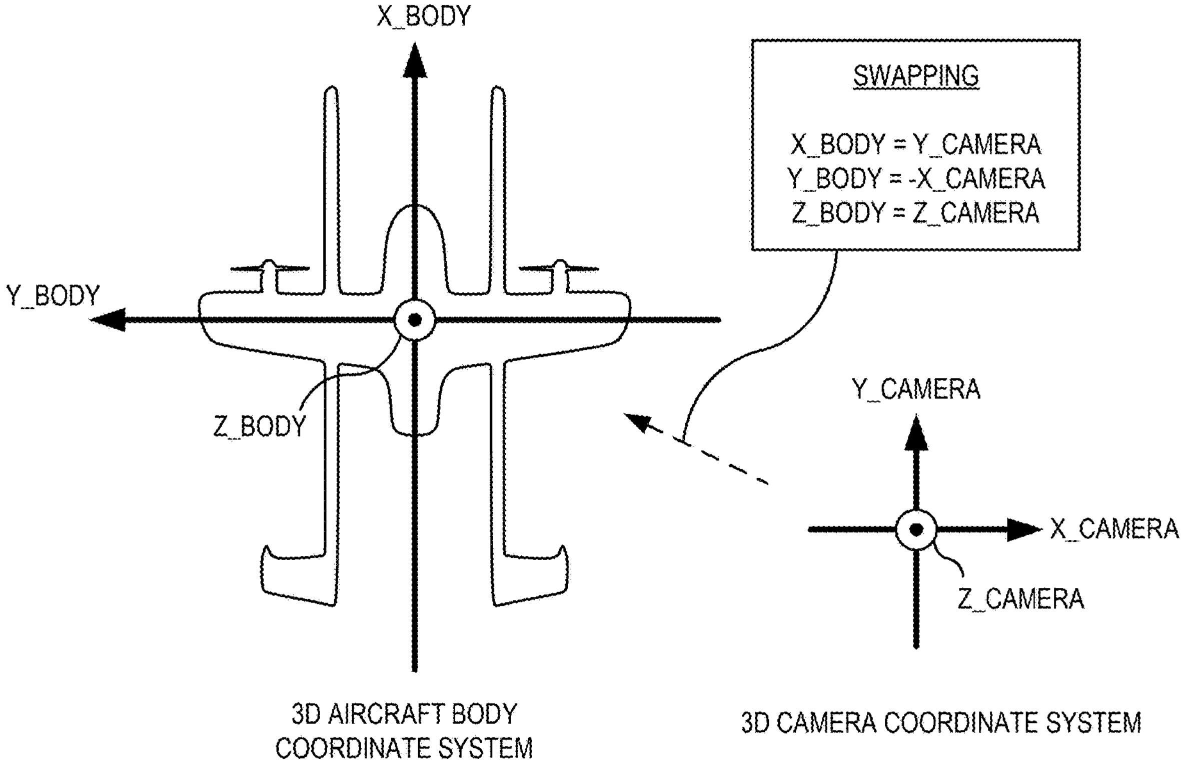
FIG. 4F illustrates swapping coordinates axes from the 3D camera coordinate system to an aircraft body coordinate system, in accordance with an embodiment of the disclosure.
Figure 4G:
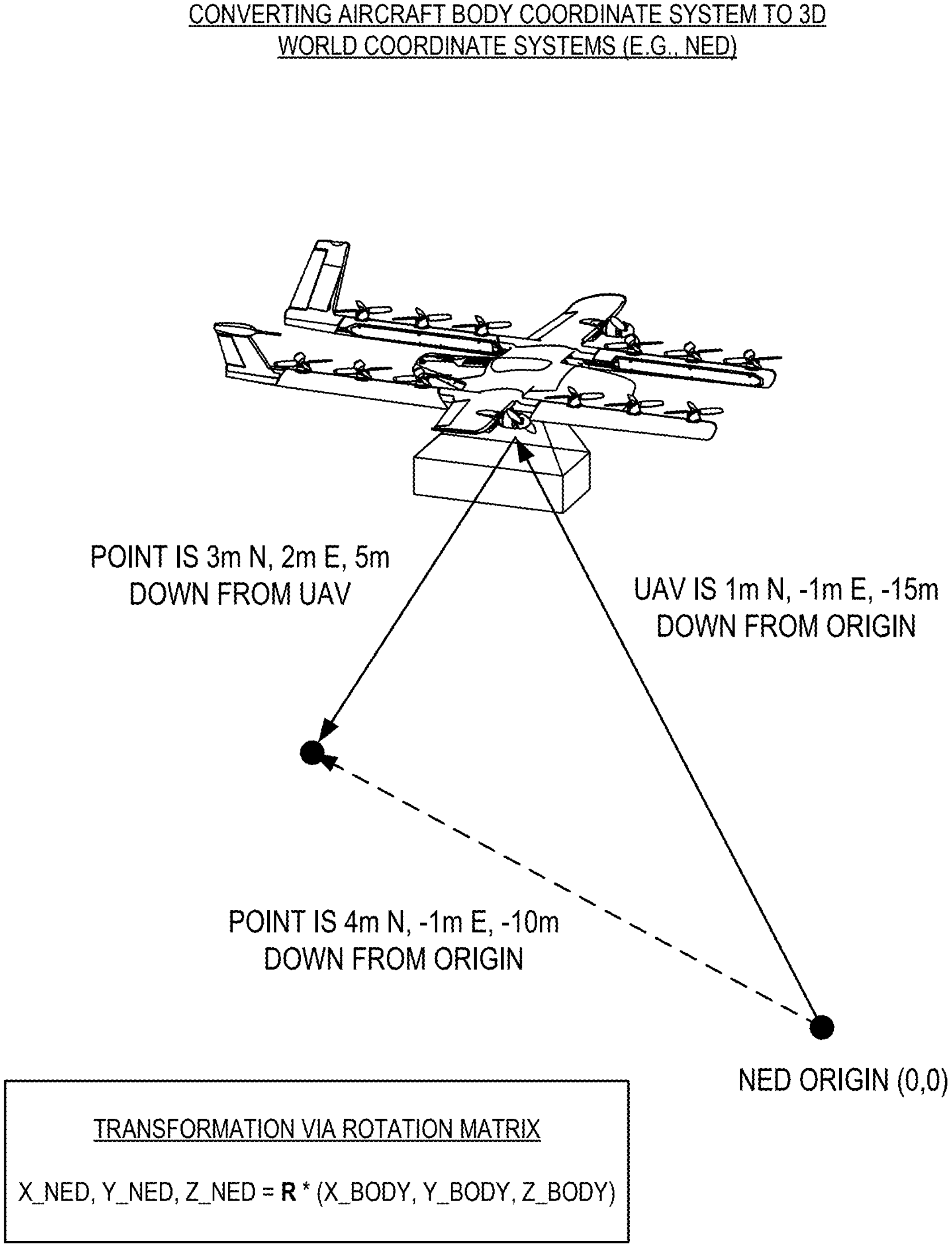
FIG. 4G illustrates transforming pixels points from the aircraft body coordinate system to a 3D world coordinate system of the world frame using a rotation matrix, in accordance with an embodiment of the disclosure.

In process blocks 335-345, the identified two offset pixel points 460 of aerial image 407D are converted to the world frame using the illustrated multistep process. It should be appreciated that process blocks 335-345 are repeated for offset pixel points 460 in each of multiple aerial images 407 to define multiple geometric planes that intersect the suspected utility line 420 (e.g., utility line 119). Referring to FIG. 4B, the two offset pixel points 460 are initially identified and defined in the 2D pixel coordinate system of aerial image 407D referred to as pixel space 465 (FIG. 4E). In process block 335, a given offset pixel point 460 is converted to a camera space 470 having a 3D camera coordinate system of onboard camera system 205. This pixel space to camera space conversion may be achieved by rescaling the two offset pixel points 460 using intrinsic parameters of onboard camera system 205 and the equations for X_camera, Y_camera, and Z_camera illustrated in FIG. 4E. These intrinsic parameters include optical centers Cx and Cy along with focal lengths Fx and Fy of onboard camera system 205. After scaling between the 2D pixel space 465 and 3D camera space 470, the two offset pixel points are converted from the 3D camera coordinate system to an aircraft body coordinate system (process block 340). In one embodiment, the 3D camera coordinate system to aircraft body coordinate system conversion may be accomplished by swapping coordinate axes. FIG. 4F illustrates the coordinate axes swapping where X_body=Y_camera, Y_body=−X_camera, and Z_body=Z_camera. Finally, the two offset pixel points 460 are converted from the aircraft body coordinate system to the 3D world coordinate system of the world frame in a process block 345 so that the offset pixel points 460 are defined in a common reference frame to the UAV positions recorded in process block 315. In one embodiment, this final 3D-to-3D conversion (see FIG. 4G) is achieved by applying a rotation matrix (R) defined using XYZ Euler Angles to the pixel points defined in the aircraft body coordinate system. In the illustrated embodiment, the 3D world coordinate system of the world frame is the NED coordinate system. In the illustrated embodiment, the NED coordinate system has an origin (0,0,0) placed at the location of the landing pad from which UAV 105 commenced its aerial mission.

Figure 3B:
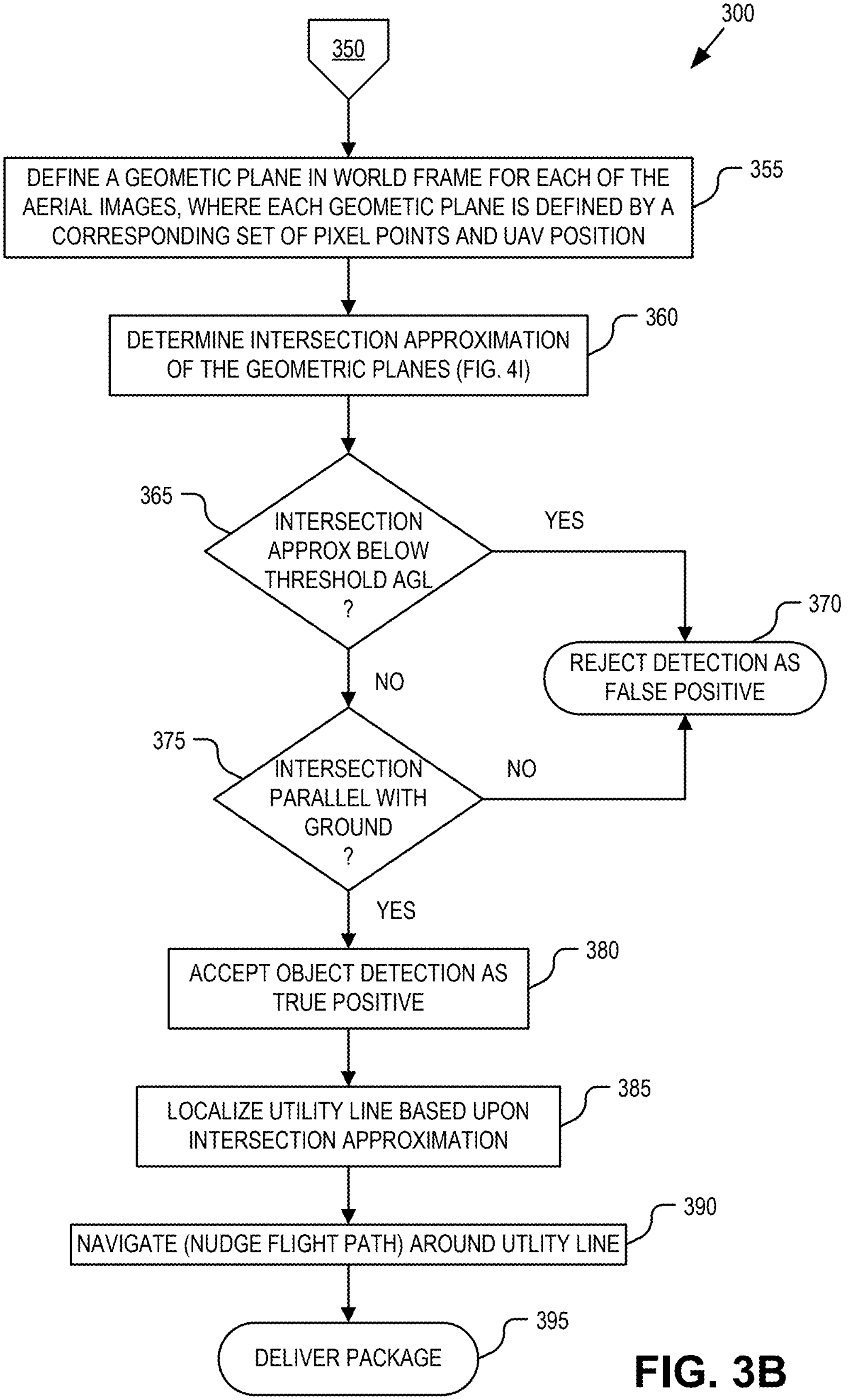
Figure 4H:
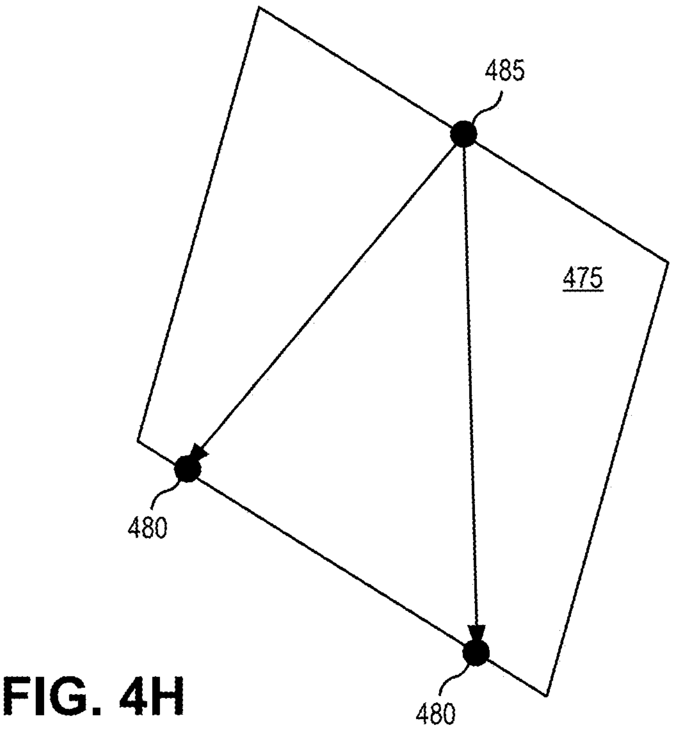
FIG. 4H illustrates how a geometric plane is defined by three points, in accordance with an embodiment of the disclosure.
Figure 4I:
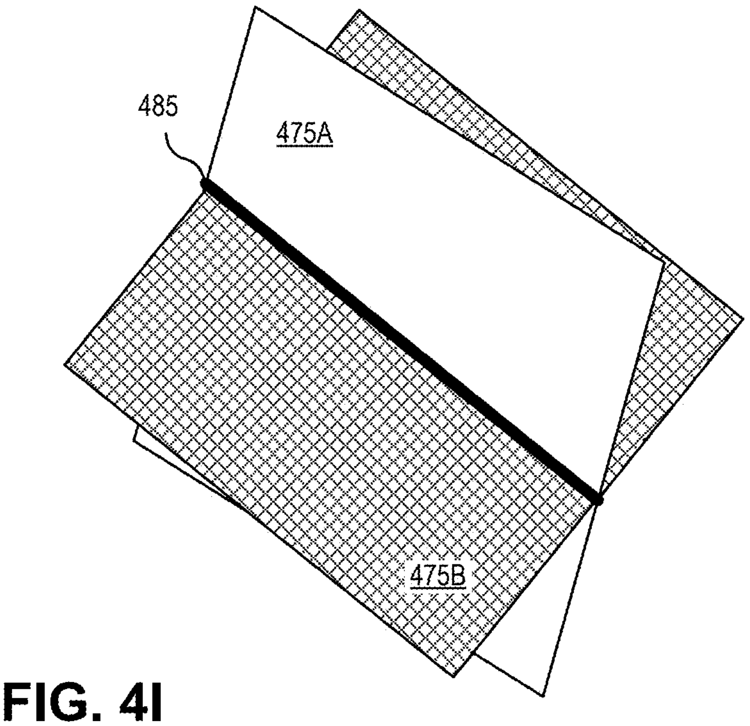
FIG. 4I illustrates how the intersection of multiple geometric planes localizes a utility line, in accordance with an embodiment of the disclosure.
Figure 4J:
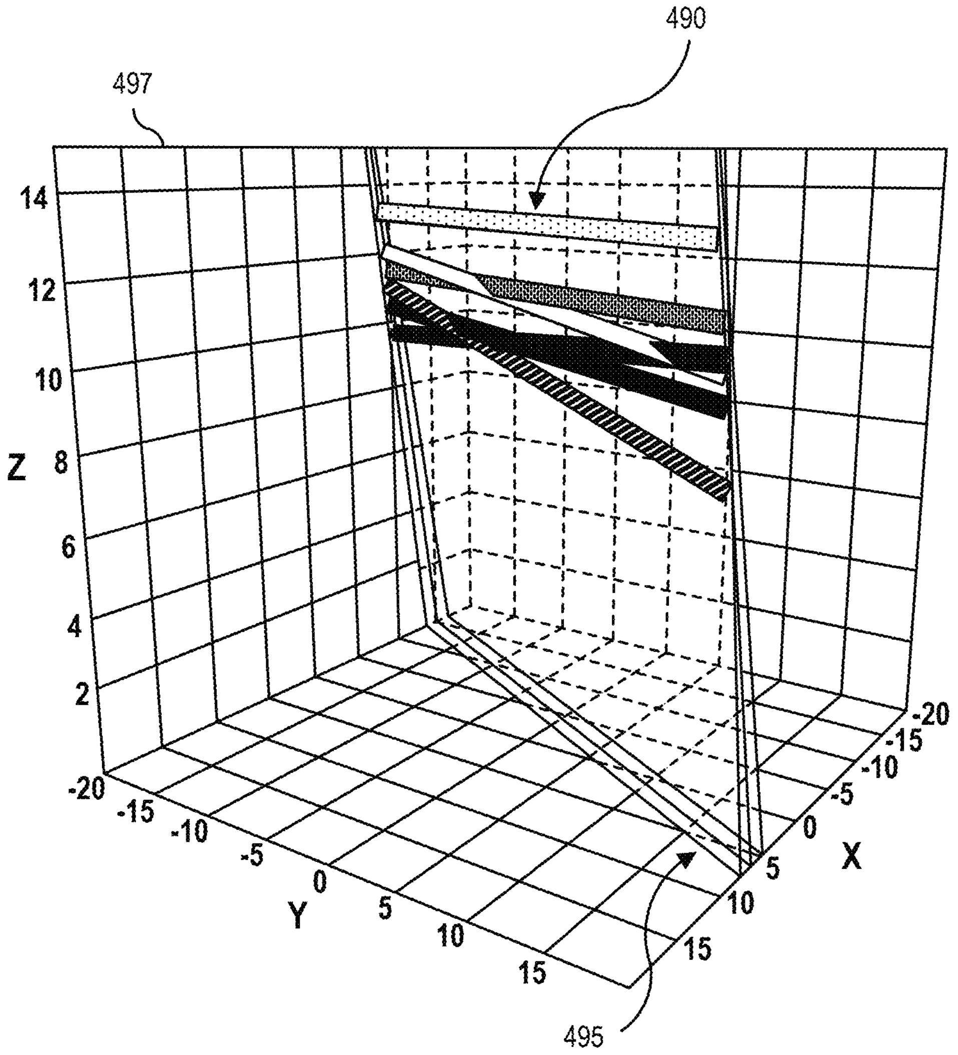
FIG. 4J illustrates how an intersection approximation may be used to localize a utility line depicted in multiple aerial images, in accordance with an embodiment of the disclosure.

With the two offset pixel points 460 and UAV position associated with each aerial image 407 converted into a common world frame (e.g., NED), process 300 continues to a process block 355 on FIG. 3B via off page reference 350. In process block 355, each set of two offset pixel points along with the UAV position for a given aerial image 407 uniquely defines a geometric plane in the world frame. FIG. 4H illustrates an example geometric plane 475 that is defined in the world frame by two offset pixel points 480 and a UAV position 485 all specified in the world frame. Multiple geometric planes 475A, 475B, etc. may be defined in the world frame corresponding to multiple different aerial images 407 (e.g., 407A, 407B, etc.). With multiple geometric planes 475 defined, an intersection approximation 485 (see FIG. 4I) is determined in process block 360. The intersection approximation 485 localizes the suspected utility line 119 in the world frame. However, due to imprecision in measuring the UAV position in process block 315 and/or identifying offset pixel points 460 in process block 330, the geometric planes 475 may not all intersect precisely along the same line but rather along a series similarly situated intersection lines 490, as illustrated in FIG. 4J. Accordingly, calculation of the intersection is an intersection approximation that may be calculated using a variety of different techniques based upon the multiple different intersections between the different geometric planes 495. In some embodiments, the intersection approximation may ignore outliers. In one embodiment, a least squares approximation is used to identify a best fit intersection of the various geometric planes 495 in the world frame 497. In one embodiment, intersection approximation 485 is a best fit intersection of multiple geometric planes 475 (or 495).

False positive utility line detections can be problematic. Accordingly, additional confidence checks may be applied against the intersection approximation 485 to reduce the incidence of false positives. False positive detections may arise from shadows on the ground, interfaces between sidewalks/driveways/lawns, and other optical illusions. Shadow lines or interfaces between sidewalks/driveways/lawns may result in intersection approximations that are close to the ground. In a decision block 365, if the intersection approximation falls below a threshold above ground level (AGL) height (e.g., below 1 m, 2 m, etc.), then the suspect utility line is rejected as a false positive detection (process block 370). Other false detections may result in intersection approximations that are far from parallel with the ground. In a decision block 375, if the intersection approximation is not parallel to the ground within a threshold angle, then the suspected utility line is rejected as a false positive detection (process block 370). The localized grade of the ground area below UAV 105 may be computed from topographical maps, assumed to be level within a threshold slope (e.g., not more than 25 or 30 percent grade, etc.), or otherwise.

If the additional confidence checks are passed, then the detected object (suspected utility line) is accepted as a true positive or valid detection of utility line 119 (process block 380). The computed intersection approximation 485 may then be used as a localization of utility line 119 in the world frame coordinate system (process block 385), which may then facilitate safe navigation around utility line 119 by nudging or otherwise altering descent pattern 120 (process block 390) to deliver the package to destination area 115 (process block 395).

Figure 5A:
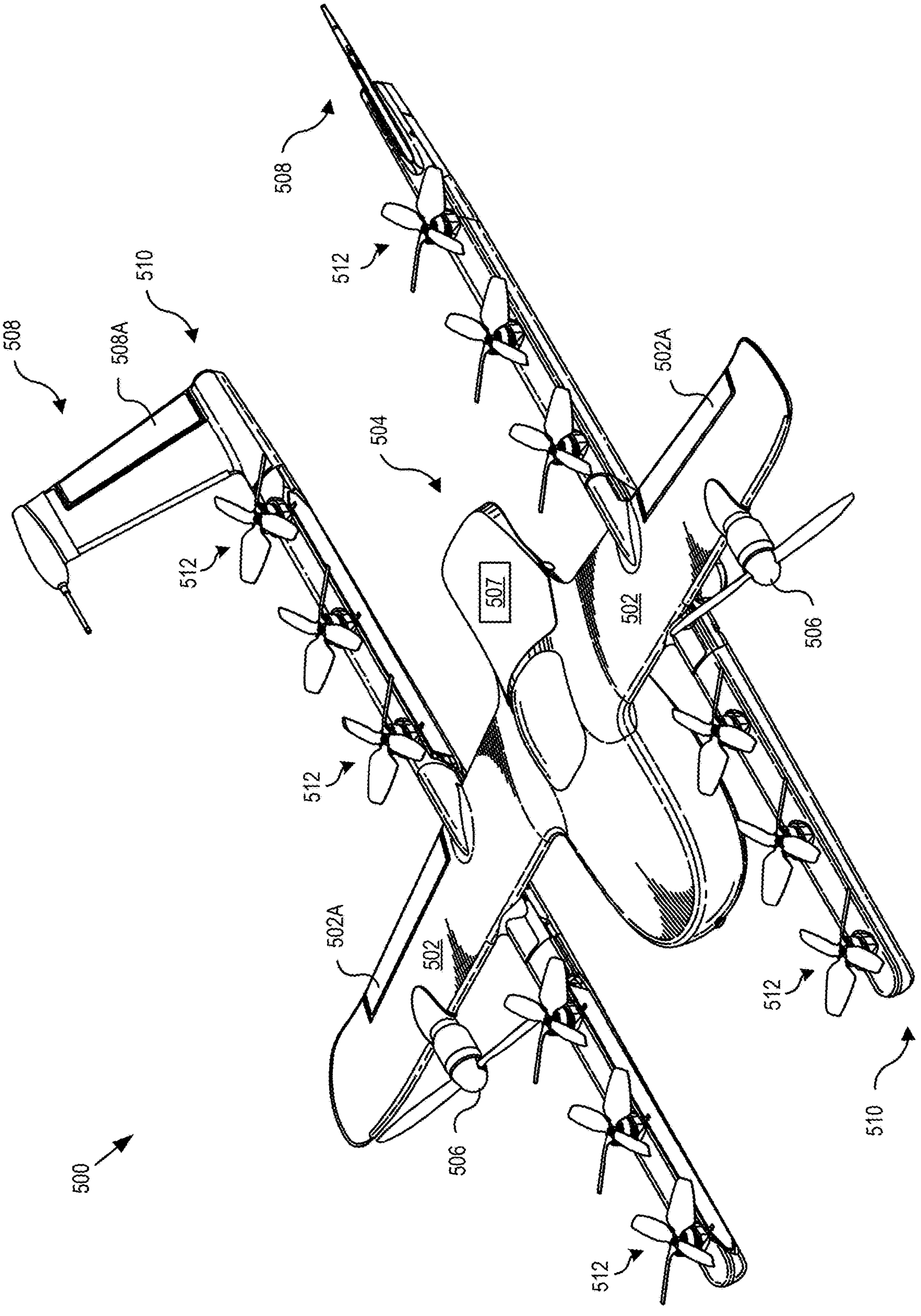
FIG. 5A is a perspective view illustration of a UAV configured for use in a UAV delivery system, in accordance with an embodiment of the disclosure.
Figure 5B:
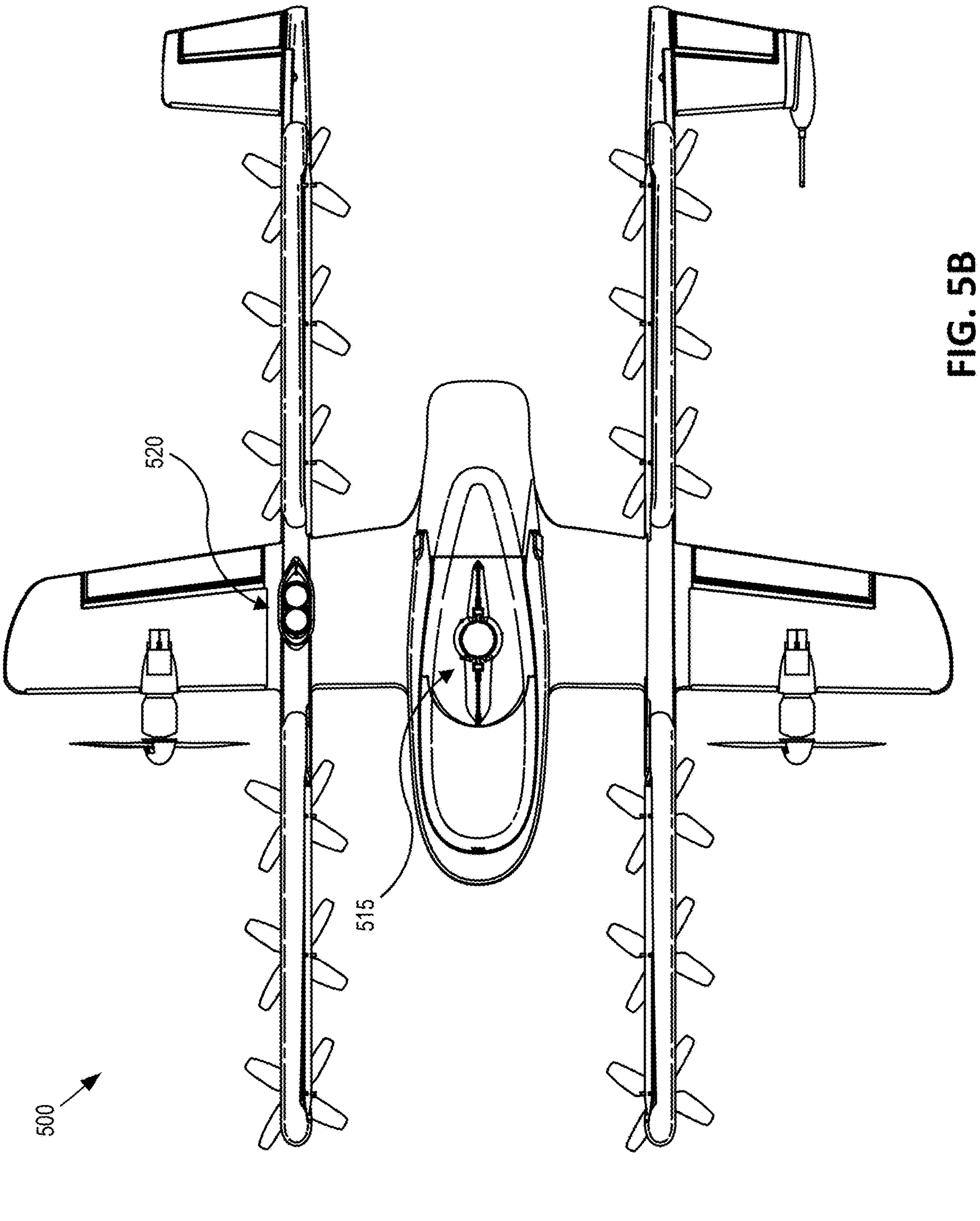
FIG. 5B is an underside plan view illustration of the UAV configured for use in the UAV delivery system, in accordance with an embodiment of the disclosure.

FIGS. 5A and 5B illustrate a UAV 500 that is well-suited for delivery of packages, in accordance with an embodiment of the disclosure. FIG. 5A is a topside perspective view illustration of UAV 500 while FIG. 5B is a bottom side plan view illustration of the same. UAV 500 is one possible implementation of UAVs 105 illustrated in FIG. 1, although other types of UAVs may be implemented for a UAV delivery service as well.

The illustrated embodiment of UAV 500 is a vertical takeoff and landing (VTOL) UAV that includes separate propulsion units 506 and 512 for providing horizontal and vertical propulsion, respectively. UAV 500 is a fixed-wing aerial vehicle, which as the name implies, has a wing assembly 502 that can generate lift based on the wing shape and the vehicle's forward airspeed when propelled horizontally by propulsion units 506. The illustrated embodiment of UAV 500 has an airframe that includes a fuselage 504 and wing assembly 502. In one embodiment, fuselage 504 is modular and includes a battery module, an avionics module, and a mission payload module. These modules are secured together to form the fuselage or main body.

The battery module (e.g., fore portion of fuselage 504) includes a cavity for housing one or more batteries for powering UAV 500. The avionics module (e.g., aft portion of fuselage 504) houses flight control circuitry of UAV 500, which may include a processor and memory, communication electronics and antennas (e.g., cellular transceiver, wifi transceiver, etc.), and various sensors (e.g., GNSS sensor, an inertial measurement unit, a magnetic compass, a radio frequency identifier reader, etc.). Collectively, these functional electronic subsystems for controlling UAV 500, communicating, and sensing the environment may be referred to as a control system 507. The mission payload module (e.g., middle portion of fuselage 504) houses equipment associated with a mission of UAV 500. For example, the mission payload module may include a payload actuator 515 (see FIG. 5B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 5B, an onboard camera 520 (e.g., onboard camera system) is mounted to the underside of UAV 500 to support a computer vision system (e.g., stereoscopic machine vision) for visual triangulation and navigation as well as operate as an optical code scanner for reading visual codes affixed to packages. These visual codes may be associated with or otherwise match to delivery missions and provide the UAV with a handle for accessing destination, delivery, and package validation information. Of course, onboard camera 520 may alternatively be integrated within fuselage 504.

As illustrated, UAV 500 includes horizontal propulsion units 506 positioned on wing assembly 502 for propelling UAV 500 horizontally. UAV 500 further includes two boom assemblies 510 that secure to wing assembly 502. Vertical propulsion units 512 are mounted to boom assemblies 510. Vertical propulsion units 512 providing vertical propulsion. Vertical propulsion units 512 may be used during a hover mode where UAV 500 is descending (e.g., to a delivery zone), ascending (e.g., at initial launch or following a delivery), or maintaining a constant altitude. Stabilizers 508 (or tails) may be included with UAV 500 to control pitch and stabilize the aerial vehicle's yaw (left or right turns) during cruise. In some embodiments, during cruise mode vertical propulsion units 512 are disabled or powered low and during hover mode horizontal propulsion units 506 are disabled or powered low.

During flight, UAV 500 may control the direction and/or speed of its movement by controlling its pitch, roll, yaw, and/or altitude. Thrust from horizontal propulsion units 506 is used to control air speed. For example, the stabilizers 508 may include one or more rudders 508A for controlling the aerial vehicle's yaw, and wing assembly 502 may include elevators for controlling the aerial vehicle's pitch and/or ailerons 502A for controlling the aerial vehicle's roll. Rudders 508A and ailerons 502A are referred to as control surfaces. While the techniques described herein are particularly well-suited for VTOLs providing an aerial delivery service, it should be appreciated that the techniques described herein are generally applicable to a variety of aircraft types (not limited to VTOLs) providing a variety of services or serving a variety of functions beyond package deliveries.

Many variations on the illustrated fixed-wing aerial vehicle are possible. For instance, aerial vehicles with more wings (e.g., an "x-wing" configuration with four wings), are also possible. Although FIGS. 5A and 5B illustrate one wing assembly 502, two boom assemblies 510, two horizontal propulsion units 506, and six vertical propulsion units 512 per boom assembly 510, it should be appreciated that other variants of UAV 500 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method executed by an unmanned aerial vehicle (UAV), comprising:

capturing a plurality of aerial images of a ground area below the UAV;

detecting a presence of an object in the aerial images suspected to be a utility line;

identifying two offset pixel points in each of the aerial images that coincide with the object in each of the aerial images;

converting the two offset pixel points in each of the aerial images to a world frame;

defining a plurality of geometric planes in the world frame each corresponding to one of the aerial images, wherein each of the geometric planes is defined by a position of the UAV when capturing a corresponding one of the aerial images and the two offset pixel points in the world frame corresponding to the one of the aerial images;

determining an intersection approximation of the geometric planes in the world frame to localize the object;

localizing the object based upon the intersection approximation; and navigating the UAV around the object based upon the localizing.

2. The method of claim 1, further comprising:

rejecting the object as a false positive detection of the utility line when the intersection approximation of the geometric planes falls below a threshold above ground level (AGL) height.

3. The method of claim 1, further comprising:

rejecting the object as a false positive detection of the utility line when the intersection approximation of the geometric planes is not parallel to a ground within a threshold angle.

4. The method of claim 1, wherein detecting the presence of the object in the aerial images suspected to be the utility line comprises:

using at least one of a semantic segmentation of one or more of the aerial images, a stereovision depth map based on one or more of the aerial images, or a line detection algorithm applied to one or more of the aerial images to detect the presence of the object.

5. The method of claim 4, wherein detecting the presence of the object in the aerial images suspected to be the utility line comprises comparing at least two of the semantic segmentation, the stereovision depth map, or line detection algorithm for detection agreement.

6. The method of claim 1, wherein converting the two offset pixel points in each of the aerial images to the world frame comprises:

converting the two offset pixel points defined in a two-dimensional (2D) pixel coordinate system of the aerial images to a three-dimensional (3D) world coordinate system of the world frame.

7. The method of claim 6, wherein converting the two offset pixel points defined in the 2D pixel coordinate system to the 3D world coordinate system comprises:

converting the two offset pixel points defined in the 2D pixel coordinate system to a 3D camera coordinate system of an onboard camera system of the UAV;

converting the two offset pixel points in the 3D camera coordinate system to an aircraft body coordinate system of the UAV; and converting the two offset pixel points in the aircraft body coordinate system to the 3D world coordinate system of the world frame.

8. The method of claim 7, wherein:

converting the two offset pixel points in the 2D pixel coordinate system to the 3D camera coordinate system of the onboard camera system comprises rescaling the two offset pixel points using intrinsic parameters of the onboard camera system; and converting the two offset pixel points in the 3D camera coordinate system to the aircraft body coordinate system of the UAV comprises swapping coordinate axes.

9. The method of claim 7, wherein the 3D world coordinate system comprises a North East Down (NED) coordinate system and wherein converting the two offset pixel points in the aircraft body coordinate system to the 3D world coordinate system comprises applying a rotation matrix defined using XYZ Euler Angles to the two offset pixel points in the aircraft body coordinate system.

10. The method of claim 1, wherein determining the intersection approximation of the geometric planes comprises applying a least squares approximation to identify a best fit intersection of the geometric planes in the world frame.

11. At least one non-transitory machine-readable medium having instructions stored thereon that, in response to execution, cause an unmanned aerial vehicle (UAV) to perform operations comprising:

capturing a plurality of aerial images of a ground area below the UAV;

recording a position of the UAV when capturing each of the aerial images;

detecting a presence of an object in the aerial images suspected to be a utility line;

identifying two offset pixel points in each of the aerial images that coincide with the object in each of the aerial images;

converting the two offset pixel points in each of the aerial images to a world frame;

defining a plurality of geometric planes in the world frame each corresponding to one of the aerial images, wherein each of the geometric planes is defined by the position of the UAV when capturing a corresponding one of the aerial images and the two offset pixel points in the world frame corresponding to the one of the aerial images;

determining an intersection approximation of the geometric planes in the world frame to localize the object;

localizing the object based upon the intersection approximation; and navigating the UAV around the object based upon the localizing.

12. The at least one non-transitory machine-readable medium of claim 11, wherein the operations further comprise:

rejecting the object as a false positive detection of the utility line when the intersection approximation of the geometric planes falls below a threshold above ground level (AGL) height.

13. The at least one non-transitory machine-readable medium of claim 11, wherein the operations further comprise:

rejecting the object as a false positive detection of the utility line when the intersection approximation of the geometric planes is not parallel to a ground within a threshold angle.

14. The at least one non-transitory machine-readable medium of claim 11, wherein detecting the presence of the object in the aerial images suspected to be the utility line comprises:

using at least one of a semantic segmentation of one or more of the aerial images, a stereovision depth map based on one or more of the aerial images, or a line detection algorithm applied to one or more of the aerial images to detect the presence of the object.

15. The at least one non-transitory machine-readable medium of claim 14, wherein detecting the presence of the object in the aerial images suspected to be the utility line comprises comparing at least two of the semantic segmentation, the stereovision depth map, or line detection algorithm for detection agreement.

16. The at least one non-transitory machine-readable medium of claim 11, wherein converting the two offset pixel points in each of the aerial images to the world frame comprises:

converting the two offset pixel points defined in a two-dimensional (2D) pixel coordinate system of the aerial images to a three-dimensional (3D) world coordinate system of the world frame.

17. The at least one non-transitory machine-readable medium of claim 16, wherein converting the two offset pixel points defined in the 2D pixel coordinate system to the 3D world coordinate system comprises:

converting the two offset pixel points defined in the 2D pixel coordinate system to a 3D camera coordinate system of an onboard camera system of the UAV;

converting the two offset pixel points in the 3D camera coordinate system to an aircraft body coordinate system of the UAV; and converting the two offset pixel points in the aircraft body coordinate system to the 3D world coordinate system of the world frame, wherein the 3D world coordinate system comprises a North East Down (NED) coordinate system.

18. The at least one non-transitory machine-readable medium of claim 11, wherein determining the intersection approximation of the geometric planes comprises determining a best fit intersection of the geometric planes in the world frame.

19. At least one non-transitory machine-readable medium having instructions stored thereon that, in response to execution, cause an unmanned aerial vehicle (UAV) to perform operations comprising:

capturing a plurality of aerial images of a ground area below the UAV;

detecting a presence of an object in the aerial images suspected to be a utility line;

identifying two offset pixel points in each of the aerial images that coincide with the object in each of the aerial images;

defining a plurality of geometric planes each of which corresponds to one of the aerial images, wherein each of the geometric planes is determined based at least in part on a position of the UAV when capturing a corresponding one of the aerial images and the two offset pixel points corresponding to the one of the aerial images;

determining an intersection approximation of the geometric planes to localize the object; and navigating the UAV around the object based at least in part upon the intersection approximation.

* * * * *